United States Patent [19]

Asai et al.

[11] Patent Number: 5,501,526
[45] Date of Patent: Mar. 26, 1996

[54] SLIDING BEARING

[75] Inventors: Hiromitsu Asai, Kanagawa; Takahiko Uchiyama, Fujisawa, both of Japan

[73] Assignee: NSK Ltd., Tokyo, Japan

[21] Appl. No.: 259,872

[22] Filed: Jun. 15, 1994

[30] Foreign Application Priority Data

Jun. 15, 1993  [JP]  Japan .................................. 5-143868
Jan. 28, 1994  [JP]  Japan .................................. 6-008902

[51] Int. Cl.$^6$ ................................................. F16C 29/02
[52] U.S. Cl. ............................. 384/13; 384/42; 384/909
[58] Field of Search ........................... 384/13, 42, 909, 384/222, 203, 151, 299

[56] References Cited

U.S. PATENT DOCUMENTS 4,207,757  6/1980  Onuma ................................... 384/203
4,323,357  4/1982  Nagano .................................. 384/151
4,744,677  5/1988  Tanaka et al. .......................... 384/222
5,114,245  5/1992  Tanaka et al. .......................... 384/112

FOREIGN PATENT DOCUMENTS 5225507  12/1973  Japan .
4843374  7/1977   Japan .

*Primary Examiner*—Lenard A. Footland
*Attorney, Agent, or Firm*—Helfgott & Karas

[57] ABSTRACT

A sliding bearing having a sliding surface adapted to move with reference to a sliding guide surface with the sliding surface of the bearing faced to the sliding guide surface, the bearing comprising a sliding bearing member made of synthetic resin to substantially define the sliding surface of the bearing and a lubricating composition member made of thermoplastic or thermosetting resin that contains lubricating oil such as mineral oil therein and assembled with the sliding bearing member to partly define the sliding surface of the bearing.

30 Claims, 9 Drawing Sheets

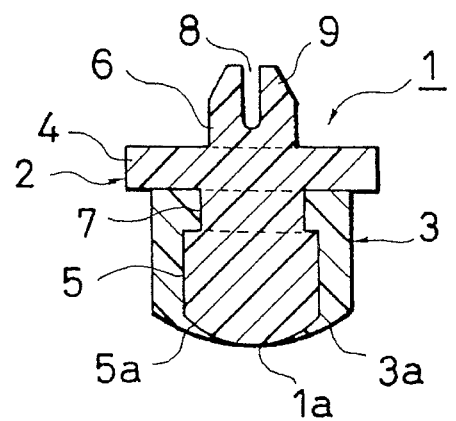
FIG. 1(a)
FIG. 1(b)
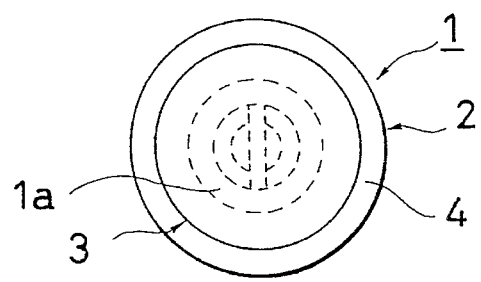
FIG. 2(a)
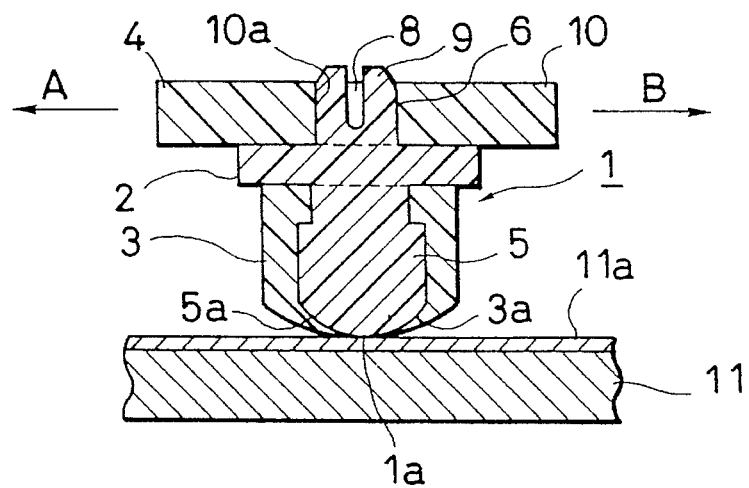

FIG. 18
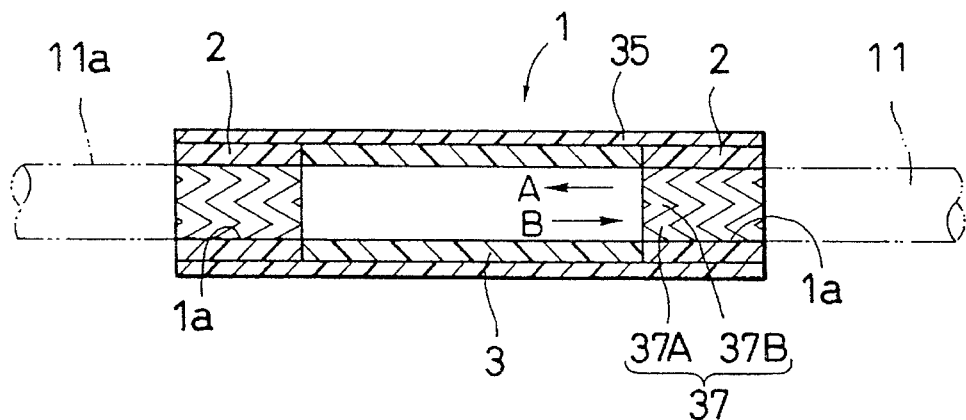
FIG. 19(a)     FIG. 19(b)
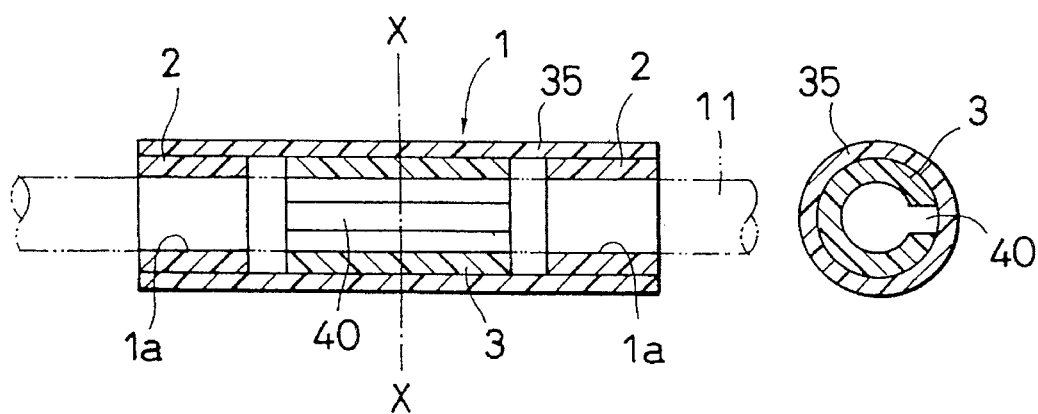 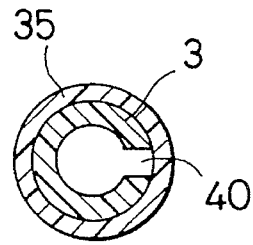
FIG. 20
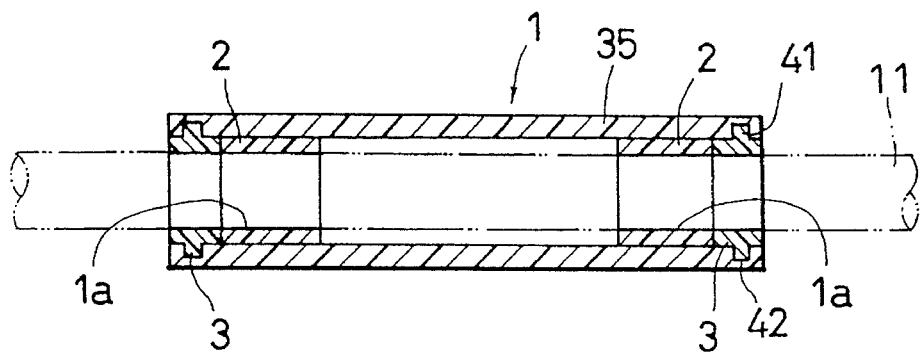

SLIDING BEARING

BACKGROUND OF THE INVENTION

1. Field of the Invention

The present invention relates to a sliding bearing which is operated for a sliding motion on a flat or curved surface or along a shaft and is used in office equipment, acoustic or audio apparatus, measuring instruments, and the like.

2. Description of the Prior Art

Formerly, linear-motion sliding bearings combined with a track have been used as the sliding guide mechanism for linearly sliding parts of various devices. These sliding bearings has a sliding surface which faces the flat sliding surface of the track and moved linearly back-and-forth along the track. Lubrication oil (liquid lubricant) or grease (semi-solid lubricant) is applied to the sliding surface of the track beforehand to reduce friction and wear of the sliding surface of the linear-motion sliding bearing and the sliding surface of the track. Also, A small depression is formed on a portion of the linear-motion sliding bearing in which the lubrication oil or grease is stored, and from here it is supplied to both sliding surfaces.

However, when lubrication oil or grease is applied beforehand to the sliding surface of the track, if the amount applied is too little, the lubricant runs out in a short time. On the other hand, if the amount applied is too much, lubricant is scattered and splashed when the linear-motion sliding bearing moves over the sliding surface of the track. Not only is this a waste of lubricant, but the lubricant that is scattered and splashed dirties the equipment that is near the linear-motion sliding bearing.

In the case of grease, because it is a semi-solid lubricant, the amount of scattering or splashing is inclined to be less than for lubricating oil, but it is limited in a reduction of the friction characteristics, and the ability for the lubricant to be drawn and spread over the sliding surface is poor, therefore improvement of the wear characteristics is worse than that of lubricating oil.

Also, even when the lubricating oil or grease is stored in a shallow depression formed on part of the linear-motion sliding bearing, as the sliding speed of the linear-motion sliding bearing increases, the lubricating oil or grease is scattered or splashed, and the same problems as mentioned above of the lubricant running out in a short time, or the lubricant being splashed and dirtying the surrounding equipment are still unsolved.

Meanwhile, there is a conventional sleeve-type sliding bearing which engages and slides along a shaft, for example, as a mechanism for guiding the sliding motion of parts which make up an apparatus. The inner peripheral sliding surface of this bearing opposes the external sliding surface of the shaft.

A synthetic resin with good self-lubricating characteristics is used independently for such a conventional sliding bearing. To improve the friction- and wear-resistance of the synthetic resin material, for example, a synthetic resin is impregnated with several percent by weight of lubricating oil, or the like, and a solid lubricating agent or lubricating oil, or a wear-resistant fiber such as carbon fiber or the like, are used independently or in combination dispersed throughout the synthetic resin.

However, whether the synthetic resin is used independently or used with a lubricating agent or fiber material dispersed throughout, satisfactory friction- and wear-resistance has not as yet been obtained for the sliding surface. For this reason it is often necessary to apply to the sliding surface of the bearing a lubricating agent such as lubricating oil or grease.

In such a case however, when the amount of application is small, the friction factor is sufficiently low at the beginning of the bearing operation, but the lubricating agent runs out after the bearing has been in use for only a short time. Therefore there is the problem that the friction- and wear-characteristics of the bearing deteriorate conspicuously.

In addition, when the amount of application of the lubricant is excessive, a phenomenon of lubricant outflow occurs or the lubricating agent is expelled when the bearing slides, causing the problem of soiling around the periphery of the bearing.

SUMMARY OF THE INVENTION

Taking into consideration the problems mentioned above, the objective of this invention is to provide a linear-motion sliding bearing whose lubricant does not run out quickly even when the sliding speed of the bearing increases, and whose lubricant does not dirty the surrounding equipment.

An object of this invention is to provide, in order to accomplish its objective mentioned above, a linear-motion sliding bearing which has a sliding surface which faces and moves linearly on the sliding surface of a track, and which comprises a sliding bearing member made of synthetic resin and a lubricating composition member of synthetic resin that contains lubrication oil, and where at least part of the lubricating composition member partly defines the sliding surface of the bearing.

Another object of the present invention is to provide, with due consideration to the drawbacks of such conventional devices, a sliding bearing with superior friction-resistant and wear-resistant characteristics wherein the lubricating agent never runs out and no soiling is produced at the periphery of the bearing by the lubricating agent.

The object of the present invention is achieved by the provision of a sliding bearing which operates with a sliding motion along a shaft, comprising a sliding bearing member made of a synthetic resin opposing the shaft, and a lubricating composition member made of a lubricant-oil-containing resin opposing the shaft.

The linear-motion sliding bearing in the first feature of this invention moves back-and-forth over a track having a sliding surface, and slides on the sliding surface of the track. When the bearing moves over the sliding surface of the track, the large quantity of lubricating oil contained in the lubricating composition member at least part of which appears on the sliding surface of the bearing, gradually spreads or feathers over the area and is supplied to the sliding surfaces of both the bearing and track. The lubricating oil is supplied in adequate amounts over a long period of time, and displays excellent lubricating capability. Therefore, the lubrication oil does not run out. Also, even if the speed of the bearing increases, the lubricating oil is not scattered or splashed, so the surrounding equipment is not dirtied.

Furthermore, since a liquid lubricant is used, the friction characteristics of which are better than for grease, it is drawn and spread over the sliding surfaces very well, and the wear characteristics are also very good.

The sliding bearing in the second feature of the present invention moves by sliding along a shaft. At this time, a large quantity of lubricating oil contained in the body of the lubricating composition member opposing the shaft is gradually fed into a gap between the sliding bearing and the shaft. The proper amount of lubricating oil is provided over a long period.

In addition, because the lubricating oil is contained in the composition member with lubricating characteristics, there is no outflow of the lubricating agent, and when the bearing slides the lubricating agent is not expelled.

BRIEF DESCRIPTION OF ACCOMPANYING DRAWINGS

FIG. 1(a) is a front cross-sectional view showing a first embodiment of this invention;

FIG. 1(b) is a bottom plan view of the embodiment of FIG. 1(a);

FIG. 2(a) is a front cross-sectional view showing an example of use of the embodiment shown in FIG. 1;

FIG. 18 is a longitudinal cross-sectional view of another embodiment of the present invention.

FIG. 19(a) is a longitudinal cross-sectional view of another embodiment of the present invention.

FIG. 19(b) is a cross-sectional view taken along the line X—X of FIG. 12(a).

FIG. 20 is a longitudinal cross-sectional view of another embodiment of the present invention.

DETAILED DESCRIPTION OF THE PREFERRED EMBODIMENTS

Figure 2B:
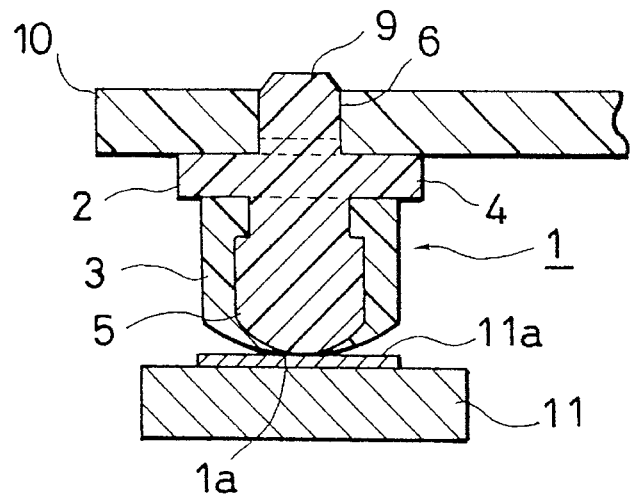
FIG. 2(b) is a side cross-sectional view of the embodiment of FIG. 2(a)

Now, some preferred embodiments of the invention will be described using the drawings as a reference.

FIG. 1(a) is a front cross-sectional view and FIG. 1(b) is a bottom plan view showing a first embodiment of the invention applied to a flat sliding surface.

This linear-motion sliding bearing 1 comprises a sliding bearing member 2 made of synthetic resin, and a lubricating composition member 3 assembled integrally with the sliding bearing member 2. The bearing 1 has a bottom surface which is the sliding surface 1a.

The aforementioned lubricating composition member 3 is formed from a thermoplastic resin such as a polyolefin polymer or thermosetting resin which contains lubricating oil, and the lubricating oil used is an oil such as mineral oil, synthetic oil, ester oil, or diester oil, It is desirable that the amount of lubricating oil contained in the lubricating composition member 3 is 10 to 90% by weight desirably 20 to 90% by weight. If the amount of lubricating oil is less than 10% by weight, it is difficult for the lubricating effect to take place. On the other hand, it is nearly impossible to make the amount of lubricating oil contained more than 90% of weight.

The aforementioned sliding bearing member 2 has a flange section 4, a column-shaped body section 5 which hangs or depends down from the flange section 4, and an installation section 6 which protrudes up from the top surface of the flange section 4. The bottom surface 5a of the body section 5 is spherical, and a ring-shaped or annular groove 7 is formed around the base of the body section 5 which is continuous to the flange section 4 to securely support the lubricating composition member 3. The installation section 6 is formed in a column shape having a taper end section which is divided by a groove 8 into two elastic protrusions or fork ends 9 and is constructed such that the restorative elastic force of the protrusions 9 form a snap fit.

The lubricating composition member 3 is formed so that it wraps around the entire surface of the body section 5 of the aforementioned sliding bearing member 2. The bottom surface 3a of the lubricating composition member 3 is formed in a spherical surface having a larger radius than the spherical bottom surface 5a of the body section 5 of the sliding bearing member 2. Therefore, the thickness of the spherical wall section of the bottom surface 3a becomes gradually thinner toward the crest of the spherical surface. For example, it is an extremely thin film of 10 μm or less at the crest of the spherical surface. The reason for this is so that the height of the linear-motion sliding bearing 1 is not changed too large as the lubricating composition member 3 is worn away at the crest of the spherical surface by the motion of the bearing 1. If the bearing is not hindered by changes in height, the thickness of this portion may be thicker.

In this way, in this embodiment of the invention, the lubrication composition member 3 appears on the sliding surface 1a of the linear-motion sliding bearing 1.

Next, its application will be described.

As shown in FIGS. 2(a) and 2(b), the linear-motion sliding bearing 1 is installed underneath a mobile table 10 and associated with an axially long stationary track 11 which is sliding guide member.

The snap-fit installation section 6 which is divided into two elastic protrusions 9 is inserted into the bearing installation hole 10a in the mobile table 10, so that it is possible to attach and detach the bearing 1 easily with one touch action.

The mobile table 10 installed with the linear-motion sliding bearing 1 moves back-and-forth over and guided by the level sliding surface 11a of the sliding guide member or axially long stationary track 11 in the two directions shown by the arrows A and B in the figure. As the mobile table 10 moves, so does the linear-motion sliding bearing 1. When the table 10 moves, the crest of the spherical sliding surface 1a of the linear-motion sliding bearing 1, which is covered by the lubricating composition member 3, moves over the sliding surface 11a of the track 11. Lubricating oils which is contained beforehand in the lubricating composition member 3 feathers and penetrates onto this area of movement, and lubricates between the sliding surface 1a of the linear-motion sliding bearing 1 and the sliding surface 11a of the track 11.

There is a large quantity of lubricating oil contained inside the lubrication composition member 3, and the lubrication composition member 3 supplies adequate amounts of lubricating oil for a long time, preventing lubricating oil from running out. Also, its friction characteristics are better than grease, and the wear characteristics are excellent, assuring low friction, low wear and long life.

Furthermore, an excess of lubricating oil is not supplied to the sliding surface 1a, so even if the speed of motion becomes faster, the lubricating oil is not splashed or spattered by the linear-motion sliding bearing 1, and does not dirty the equipment set up near the bearing.

It will be noted that in the first embodiment, at first the sliding surface 1a of the bearing 1 is covered by a thin film of the lubricating composition member 3. However, as the bearing 1 moves back-and-forth, this thin film of the lubricating composition member 3 is worn away and eventually the bottom surface 5a of the sliding bearing member 2 comes into direct sliding contact with the sliding surface 11a of the track 11. Therefore, there is a change, although extremely small, in the height of the linear-motion sliding bearing 1 when this sliding motion starts.

Figure 3A:
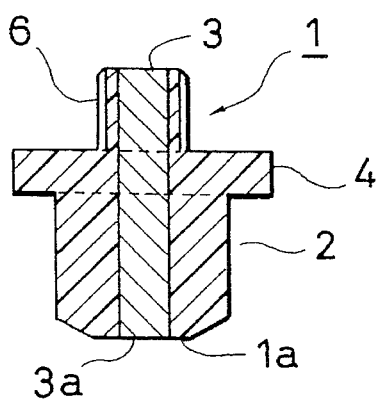
FIG. 3(a) is a front cross-sectional view showing a second embodiment of this invention.
Figure 3B:
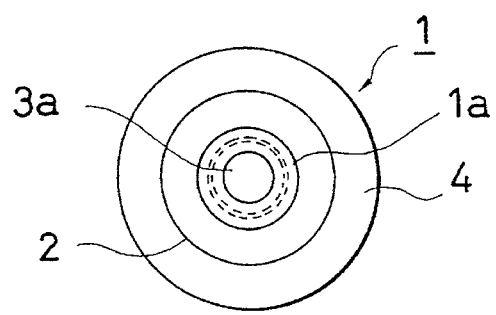
FIG. 3(b) is a bottom plan view of the embodiment of FIG. 3(a)

FIGS. 3(a) and 3(b) show a second embodiment of this invention.

This sliding bearing 1 comprises a sliding bearing member 2 made of synthetic resin, and a lubricating composition member 3 integrally fitted into the sliding bearing member This embodiment of the invention is different from the first embodiment of the invention in that the sliding surface 1a of the linear-motion sliding bearing 1 is not a spherical surface but a circular flat surface. The lubricating composition member 3 is column shaped having a smaller radius and fitted into the center of the cylindrical sliding bearing member 2 having a larger radius. The installation section 6 which is attached to the mobile table 10 does not have snap-fit construction, but is formed in a male screw so as to be screwed to the mobile table 10. In this case, the lower end 3a in a flat, circular shape of the lubricating composition member 3 appears in the center of the flat, annular sliding surface of the cylindrical sliding bearing member 2 to define part of the surface 1a of the linear-motion sliding bearing 1.

In this second embodiment of the invention, when the sliding surface 1a of the linear-motion sliding bearing 1 comes in contact with and moves over the sliding surface 11a of the track 11, the sliding bearing member 2, made of synthetic resin, comes into direct contact with the sliding surface 11a from the very first, and moves while receiving the load for the mobile table 10. This has the advantage that the change in height of the linear-motion sliding bearing 1 is smaller at the beginning of motion than the first embodiment. The other functions of this second embodiment of the invention are the same as those of the first embodiment.

Figure 4A:
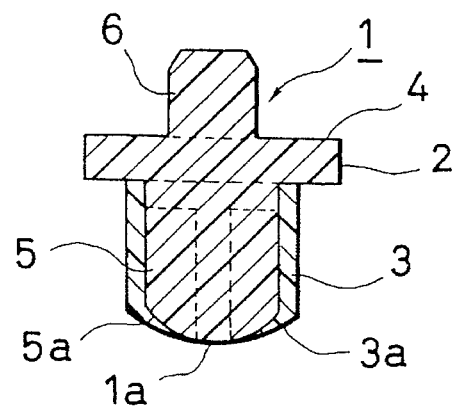
FIG. 4(a) is a front cross-sectional view showing a third embodiment of this invention.
Figure 4B:
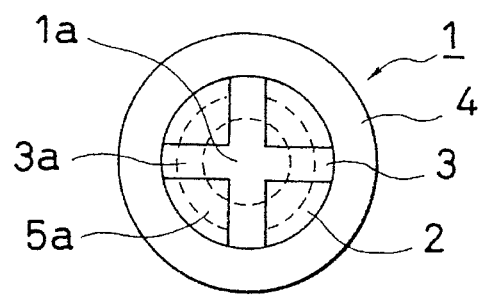
FIG. 4(b) is a bottom plan view of the embodiment of FIG. 4(a)

FIGS. 4(a) and 4(b) show a third embodiment of the invention.

The sliding bearing 1 comprises a sliding bearing member 2 made of synthetic resin, and a lubricating composition member 3 assembled integrally with the sliding member 2.

In this embodiment, the sliding surface 1a is a spherical surface as in the first embodiment. However, this embodiment differs in that the installation section 6 is not shaped in the fork ends. The columnar or cylindrical installation section 6 protrudes from the top surface of the flange 4 of the sliding bearing member 2 of synthetic resin, and is constructed so that it is press fitted into the installation hole 10a in the mobile table 10.

Also, the lubricating composition member 3 does not wrap around the entire outer surface of the body section 5 of the sliding bearing member 2, but is made of four strips that are circumferentially spaced apart evenly to run along the axial direction on the sides of the body section 5 down to the spherical bottom surface 5a to form a cross-shaped pattern at the crest of the sliding surface 1a, and so it appears on the spherical sliding surface 1a of the linear-motion sliding bearing 1 to define part of the surface 1a.

The functions and effects of this embodiment are nearly the same as those of the first embodiment.

Figure 5A:
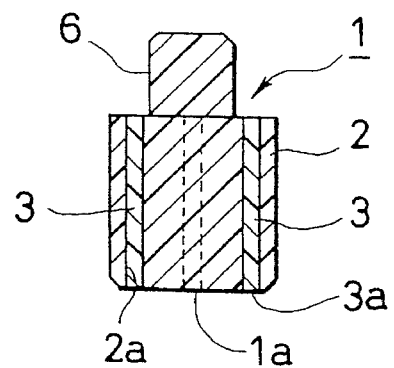
FIG. 5(a) is a front cross-sectional view showing another embodiment of this invention.
Figure 5B:
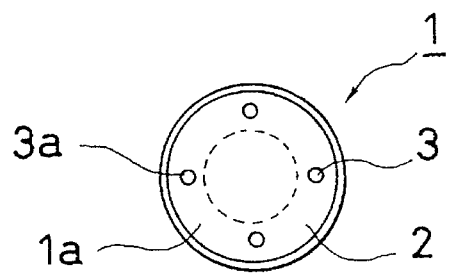
FIG. 5(b) is a bottom plan view of the embodiment of FIG. 5(a)

FIGS. 5(a) and 5(b) show another embodiment of the invention.

The linear-motion sliding bearing 1 of this embodiment comprises a sliding bearing member 2 of synthetic resin which is columnar or cylindrical and has a larger radius, and a lubricating composition member 3 in a thin columnar or cylindrical shape embedded in the sliding bearing member 2. The sliding bearing member 2 has a flat, circular bottom surface which is substantially the sliding surface 1a of the linear-motion sliding bearing 1. The top of the sliding bearing member 2 is not provided with a flange, but the column-shaped installation section 6 protrudes directly from the top surface. This installation section 6 is constructed so that it is press fitted into the installation hole 10a formed in the mobile table 10.

The lubricating composition member 3 comprises four columns having smaller radius, and they are fitted into four, evenly spaced, axial through holes located around the large-radius column-shaped sliding bearing member 2 near its outer circumference. The flat, circular bottom surfaces 3a of the lubricating composition member 3 are evenly dispersed to appear in four locations to define part of the sliding surface 1a of the linear-motion sliding bearing 1.

It should be noted that the number of lubricating compositions 3 is not limited to four.

The functions and effects of this embodiment of the invention are nearly the same as those of the second embodiment of the invention, in that the lubricating composition member 3 appears on a portion of the sliding surface 1a of the linear-motion sliding bearing 1.

Figure 6A:
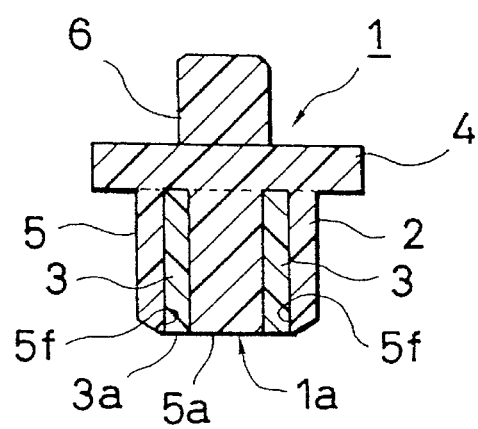
FIG. 6(a) is a front cross-sectional view showing another embodiment of this invention.
Figure 6B:
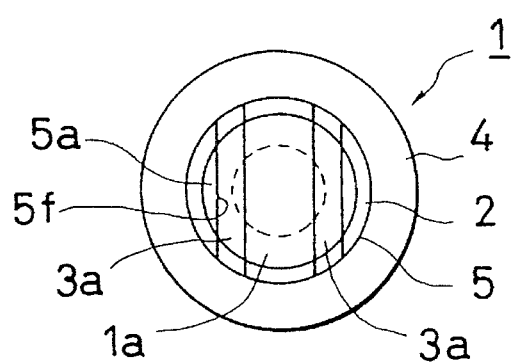
FIG. 6(b) is a bottom plan view of the embodiment of FIG. 6(a)

FIGS. 6(a) and 6(b) shows another embodiment of the invention.

The sliding bearing of this embodiment comprises a sliding bearing member 2 of synthetic resin and a lubricating composition member 3 embedded in the sliding bearing member 2.

In the linear-motion sliding bearing 1 of this embodiment, the sliding bearing member 2 of synthetic resin has a radially larger body section 5 which is columnar and has two deep axial slots 5f, and a flat, circular bottom surface 5a which substantially forms the sliding surface 1a of the linear-motion sliding bearing 1. There is a flange 4 formed on the top of the sliding bearing member 2, and there is a press-fit type of installation section 6 protruding from the top of the flange 4.

The lubricating composition member 3 is shaped in two flat plates and fitted into the deep axial slots 5f, which are formed parallel in the body section 5 of the sliding bearing member 2. The flat, bottom surfaces 3a of these board plate shaped lubricating composition member 3 appear as two parallel bands on the flat, circular sliding surface 1a of the linear-motion sliding bearing 1 to define part of the sliding surface 1a.

The functions and effects of this embodiment of the invention, are the same as those of the second embodiment in that the ends of the lubricating composition member 3 appear as part of the sliding surface 1a of the linear-motion sliding bearing 1.

Figure 7A:
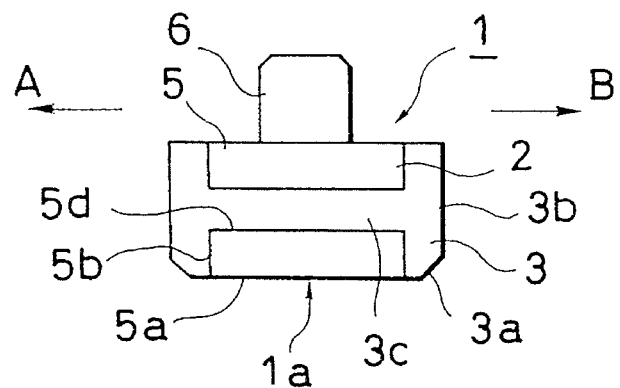
FIG. 7(a) is a front cross-sectional view showing another embodiment of this invention.
Figure 7B:
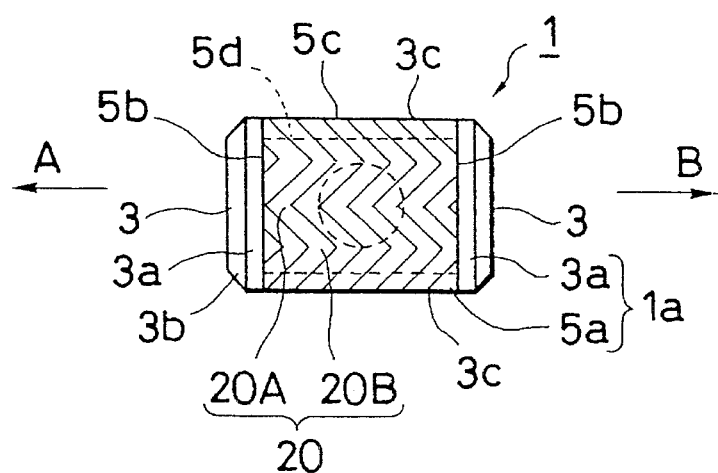
FIG. 7(b) is a bottom plan view of the embodiment of FIG. 7(a)

FIGS. 7(a) and 7(b) shows another embodiment of this invention.

In the linear-motion sliding bearing 1 of this embodiment, the sliding bearing member 2 of synthetic resin has a body section 5 which is an angular or prism-shaped block, and a bottom surface 5a which is formed with staggered grooves 20 used for generating dynamic pressure for the back-and-forth linear motion of the bearing 1. These grooves 20, used for generating dynamic pressure, are formed in a wave shape by connecting grooves 20A, which point in direction of arrow A, to grooves 20B, which point in the direction of arrow B, and they are separated by a space in the direction of bearing motion. The shape of these grooves 20 may also be flared-, diamond-shaped etc.

Here, the aforementioned lubricating composition member 3 has two plate-shaped portions 3b which cover respectively the front and rear ends 5b of the body section 5 of the sliding bearing member 2, and two band portions 3c for connecting the opposed plate-shaped portions 3b. The band portions 3c are fitted respectively inside grooves 5d that are formed in parallel in the two sides 5c of the body section 5.

The bottom surface 5a containing grooves 20 for generating dynamic pressure, is located between the bottom surfaces 3a of the both plate-shaped portions 3b of the lubricating composition member 3. The bottom surfaces 3a extend at right angles with reference to the linear motion of the bearing 1 to define the opposite edges of the rectangular sliding surface 1a of the linear-motion sliding bearing 1.

In this way, the lubricating oil that feathers or gradually penetrates from the bottom surfaces 3a of the lubricating composition member 3 which defines part of the sliding surface 1a is supplied to the grooves 20 which generate dynamic pressure. When the linear-motion sliding bearing 1 moves with the movement of the mobile table 10 in the linear direction shown by the arrow A, the pressure of the lubricating oil in the pointed section of the grooves 20B increases due to the pumping action of the grooves 20B, which face in the opposite direction. Accordingly, dynamic pressure is generated so as to support the load of the linear-motion sliding bearing 1 and mobile table 10. When the linear-motion sliding bearing 1 moves in the opposite direction shown by the arrow B, dynamic pressure is generated in the same way by the pumping action of grooves 20A, and this supports the load of the linear-motion sliding bearing 1 and mobile table 10. In this embodiment, dynamic pressure is generated by the pumping action of the grooves 20, and a film of lubricating oil is formed between the sliding surfaces 1a and 11a. In this way, this embodiment, more than the others, is able to keep wear to a minimum.

In each of the aforementioned embodiments, only one linear-motion sliding bearing 1 is used, however, multiple bearings can be used for one mobile table 10.

Also, the shape of the linear-motion sliding bearing 1 is not limited to those described in the aforementioned embodiments, but can be appropriately selected to meet specific needs.

Furthermore, the location and shape of the lubricating composition member is also not limited to those described in the embodiments above, but can be combinations of those described above, or can be located or shaped completely differently.

In addition, the sliding bearing member 2 and the lubricating composition member 3 are described as forming a single part, however, it is possible to provide the lubricating composition member 3 in a clearance fit relationship with the sliding bearing member 2 so that the lubricating composition member 3 comes by its weight in contact with the sliding surface 11a of the track 11.

As described above, the linear-motion sliding bearing of this invention comprises a sliding bearing member of synthetic resin, and a lubricating composition member made from synthetic resin that contains lubricating oil, in which because at least part of the lubricating composition member appears on the sliding surface of the bearing, the large amount of lubricating oil contained in the lubricating composition member feathers or gradually penetrates onto the sliding surface, so that it functions well for a long time in supplying adequate amounts of lubricating oil to the sliding surfaces of the bearing and track. As a result, lubricating oil on the sliding surface does not run out, and even if the speed of the sliding motion becomes fast, lubricating oil is not splashed or spattered, therefore the surrounding equipment is not dirtied.

Furthermore, since a liquid lubricant is used, the friction characteristics are better than for grease, the oil is drawn and spread well over the sliding surface, and wear is low.

Moreover, the sliding surface 11a of the track 11 described above is for a flat surface, however, the linear-motion sliding bearing of this invention may also be applied to a track whose sliding surface is curved.

A typical example of the surfaces would be a shaft which is a closed curved surface.

Figure 8:
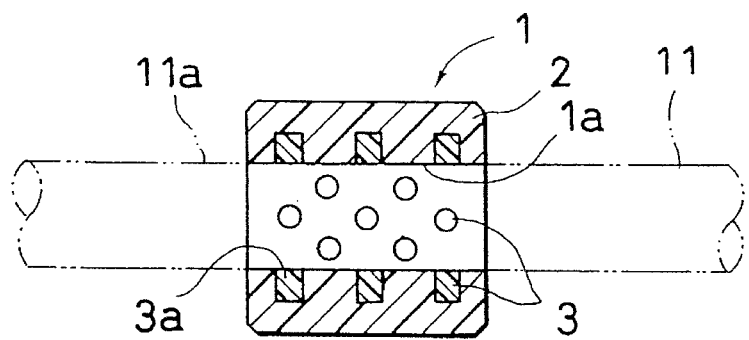
FIG. 8 is a longitudinal cross-sectional view of another embodiment of the present invention.

FIG. 8 is a view showing such an embodiment of the present invention applied to a shaft sliding surface.

A sliding bearing 1 comprises a cylindrical sliding bearing member 2 which is made of a synthetic resin and opposed to a shaft 11 which is a sliding guide member; and a lubricating composition member 3 integrally incorporated into the sliding bearing member 2. The inner peripheral surface of the sliding bearing member 2 acts as a sliding surface 1a in opposition to the cylindrical shaft 11, and is fitted around the sliding guide member or shaft 11 so that the sliding surface 1a slides freely along the shaft 11 with relative motions including rotary motion, linear motion, and the like.

The lubricating composition member 3 is a polymer made from a thermoplastic resin e.g. polyolefin in which a lubricating oil is incorporated or is a polymer made from a thermosetting resin in which a lubricating oil is incorporated, or the like. This lubricating oil can be a mineral oil, a synthetic oil, an ester oil, a diester oil, or the like.

The amount of lubricating oil contained in the lubricating composition member 3 is 10 to 90% by weight. If the amount of contained lubricating oil is less than 10 wt %, the lubricating oil readily runs out. If the amount of contained lubricating oil is greater than 90 wt %, the lubricating composition member 3 is too soft and becomes sticky, like grease. The lubricating composition member 3 also lacks strength in such a case.

In addition, the lubricating oil is soaked into the molecules and between the molecules of the synthetic resin in the lubricating composition member 3. In thermoplastic and thermosetting synthetic resins, the amount of lubricating oil which works its way into the synthetic resin can not be more than 90% of the weight of the resin.

The lubricating composition member 3 of this embodiment is formed in the small cylindrical bodies embedded in the sliding bearing member 2 in the radial direction with one end surface 3a of each cylindrical body facing so as to oppose the sliding guide member or shaft 11.

These end surfaces 3a of the lubricating composition member 3 are positioned flush with the sliding surface 1a of the sliding bearing member 2. By this arrangement the end surfaces 3a are disposed equidistantly on the periphery in a plurality of locations (in this example, four locations) in a row, so that three rows are arranged at regular intervals in the axial direction. Two additional rows are positioned out-of-phase in the peripheral direction resulting in that a total of twenty locations are provided for the end surfaces 3a.

Next, the operation will be described.

When the sliding bearing 1 slides with a rotating and linear motion with respect to the sliding guide member or shaft 4, the lubricating oil feathers or gradually spreads out from the end surfaces 3a of the lubricating composition member 3 appearing in the surface of the sliding bearing 2, in other words, partly defining the sliding surface 1a of the sliding bearing member 1, to enter the bearing gap between the sliding bearing 1 and the shaft 11, so that a lubricating action is carried out between the sliding surface 1a at the inner diameter of the sliding bearing 1 and the sliding surface 11a at the outer diameter of the shaft 11 which is in contact with the sliding surface 1a.

A large amount of lubricating oil is contained in the inner part of the lubricating composition member 3 and supplied in the proper amount over a long period of time so that it is possible to prevent the lubricating oil from running out. Furthermore, the lubricating oil has better friction characteristics than grease, and wear characteristics are also excellent because the lubricating oil is easily drawn in between the two sliding surfaces 1a and 11a, ensuring low friction, low wear, and long life.

In addition, because the lubricating oil is contained in the lubricating composition member 3, there is no excess of lubricating oil supplied to the sliding surface 1a, and no outflow or expulsion of the lubricating oil is produced so that there is no soiling around the periphery of the bearing.

Further, the end surfaces 3a of the lubricating composition member may be slightly separated from the shaft 11 so that there is no contact between the shaft 11 and the end surfaces 3a.

Figure 9:
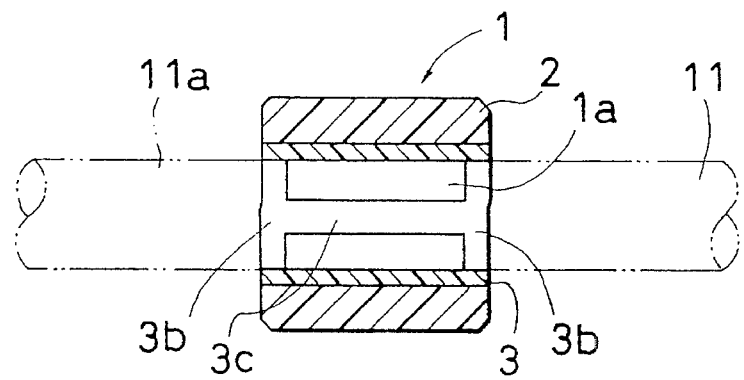
FIG. 9 is a longitudinal cross-sectional view of another embodiment of the present invention.

FIG. 9 illustrates another embodiment of the present invention.

In this embodiment the shape of the lubricating composition member 3 incorporated in the sliding bearing member 2 with its radially inner periphery for the sliding surface 1a of the bearing opposed to the sliding guide member or shaft 11 differs from the shape in the first embodiment. Specifically, the lubricating composition member 3 in this embodiment is formed in a cage shape having a cylindrical body section 3c and two annular axial end portions 3b, wherein the cylindrical body section 3c is cut open in four locations as windows in the axial direction so as to be formed in four axial band shapes 3c, so that the two axial end portions 3b on the opposite sides of the cylindrical body section 3c are connected by the cylindrical axial band shaped body section 3c. The cage-shaped lubricating composition member 3 is integrally embedded in the inner surface portion of the sliding bearing member 2 so that the inner peripheral surfaces of the sections 3b and 3c are opposed to the shaft 11. The action and effect of the sliding bearing 1 of this embodiment is almost identical to that of the first embodiment.

Figure 10:
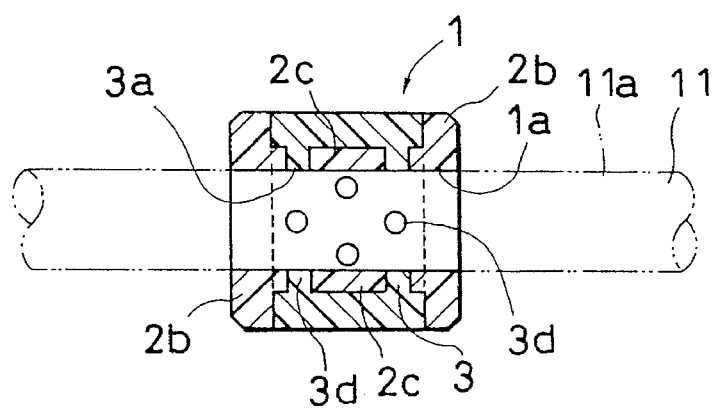
FIG. 10 is a longitudinal cross-sectional view of another embodiment of the present invention.

FIG. 10 illustrates another embodiment of the present invention.

In the sliding bearing 1 of this embodiment, the cylindrical sliding bearing member 2 comprises a body section 2c and two annular axial end sections 2b, and the outer periphery of the body section 2c is inset from the outer periphery of the end sections 2b in the shape of an indented groove. The lubricating composition member 3 formed as a cylindrical body is incorporated in this indented groove section. A plurality of small cylindrical projections 3d extend radially inwardly toward the shaft 11 through the cylindrical body section 2c to appear in the inner peripheral surface of the cylindrical body section 2c. The end faces 3a is flush with the inner periphery of the body section 2c of the sliding bearing member 2 to oppose the shaft 11.

The lubricating composition member 3 of this embodiment encloses the entire outer peripheral surface of the body section 2c of the sliding bearing member 2 and therefore has a large volume. Accordingly, there is the advantage that the lubricating composition member 3 can contain a large volume of lubricating oil. The other actions and effects are almost identical to those of the first embodiment.

Figure 11:
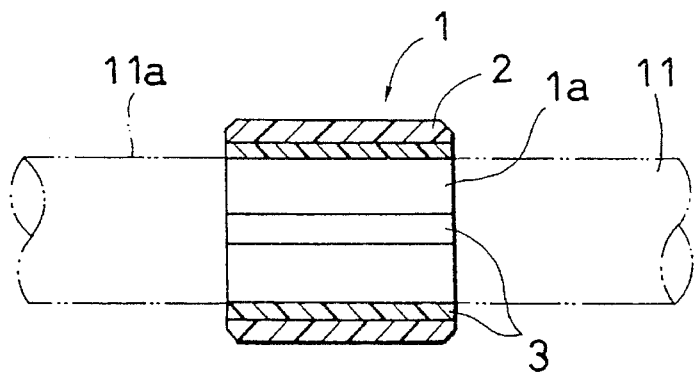
FIG. 11 is a longitudinal cross-sectional view of another embodiment of the present invention.

FIG. 11 illustrates another embodiment of the present invention.

In the sliding bearing 1 of this embodiment, a plurality of parallel grooves is formed in the axial direction in the sliding surface 1a of the bearing 1, in other words in the inner peripheral surface of the sliding bearing member 2. Lubricating composition member 3 axially extending in a band shape is incorporated into these grooves, so that the inner peripheral surfaces of the lubricating composition member 3 are opposed to the shaft 11. The lubricating composition member 3 with this shape has the advantage of simplicity and easy fabrication. The other actions and effects are almost identical to those of the first embodiment.

In the embodiment of FIG. 11, the lubricating composition member 3 is arranged in parallel bands spaced apart circumferentially and extending in the axial direction.

Figure 12:
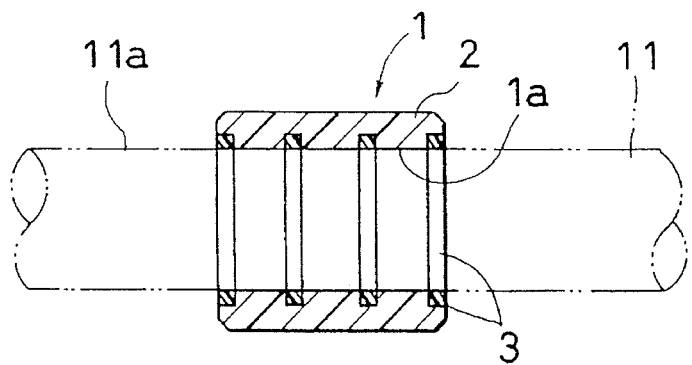
FIG. 12 is a longitudinal cross-sectional view of another embodiment of the present invention.

FIG. 12 illustrates another embodiment of the present invention having a different band structure from FIG. 11.

The sliding bearing 1 of this embodiment has a plurality of rings of the lubricating composition member 3 with the rings arranged at equal intervals in the axial direction so that the inner surfaces of the lubricating composition member 3 are opposed to the shaft 4. The actions and effects are almost identical to those of the fourth embodiment.

Figures 13A, 13B:
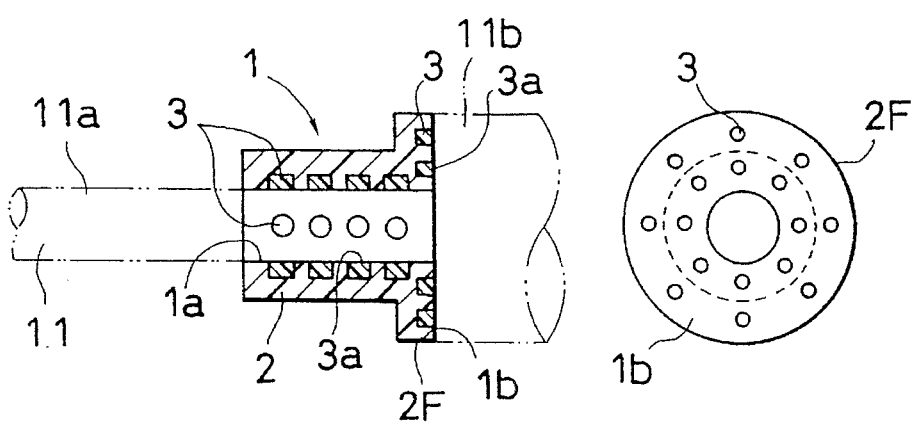
FIG. 13(a) is a longitudinal cross-sectional view of another embodiment of the present invention.
FIG. 13(b) is a side elevational view of the embodiment of FIG. 13(a).

FIGS. 13(a) and 13(b) illustrate another embodiment of the present invention.

The sliding bearing 1 of this embodiment has a flanged end section 2F which is provided on one end of the sliding bearing member 2, so that this bearing 1 acts as both a radial bearing and a thrust bearing. The cylindrical sliding surface 1a of the sliding bearing member 2 is a radial bearing surface opposed to the shaft 11, and the plane sliding surface 1b which is the end surface of the flange 2F is a thrust bearing surface opposed to the shoulder portion 11b of the shaft 11.

The lubricating composition member 3 is formed in the shape of small cylindrical bodies and radially incorporated in the sliding bearing member 2 to appear in the cylindrical inner peripheral surface of the sliding bearing member 2 in almost the same manner as in the first embodiment so that the end surfaces 3a of these small cylindrical bodies are opposed to the shaft 11.

In addition, small cylindrical bodies of the lubricating composition member 3 are axially incorporated in the flanged end section 2F in two rows in concentric circles to appear in the sliding surface 1b in the flanged end section 2F which is the thrust bearing surface.

When the sliding bearing 1 slides while rotating with reference to the shaft 11, the lubricating oil feathers from the lubricating composition member 3 which is presented to the inner periphery or sliding surface 1a of the sliding bearing 1 and to the sliding surface 1b of the flanged end section 2F, and lubricates the area between the sliding surface 11a which is the outer periphery or radial bearing surface of the shaft 11, and the thrust bearing surface or shoulder surface 11b of the shaft 11.

This is an example of a radial thrust sliding bearing exhibiting low friction, low wear, and long life.

Figures 14A, 14B:
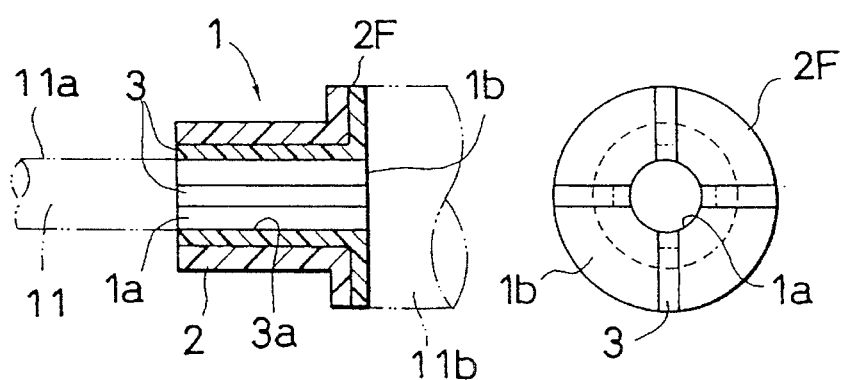
FIG. 14(a) is a longitudinal cross-sectional view of another embodiment of the present invention.
FIG. 14(b) is a side elevational view of the embodiment of FIG. 14(a).

FIGS. 14(a) and 14(b) illustrate another embodiment of the present invention.

The sliding bearing 1 of this embodiment is also an example of both a radial and a thrust sliding bearing. This bearing differs from the embodiment of FIG. 13 in that the lubricating composition member 3 is not formed as a small cylindrical body. Specifically, a plurality of axial grooves is formed parallel to the axial direction on the inner peripheral surface of the sliding bearing member 2 which generally defines the sliding surface 1a of the bearing 1. These axial grooves are continued to radial grooves which extend radially to the outer periphery of the sliding surface 1b of the flanged end section 2F, and an L-shaped lubricating composition member 3 is incorporated into the respective grooves, so that the surface 3a is opposed to the shaft 11.

The lubricating composition member 3 with this shape has the advantage of simplicity and easy fabrication. The other actions and effects are almost identical to those of the sixth embodiment.

Figure 15:
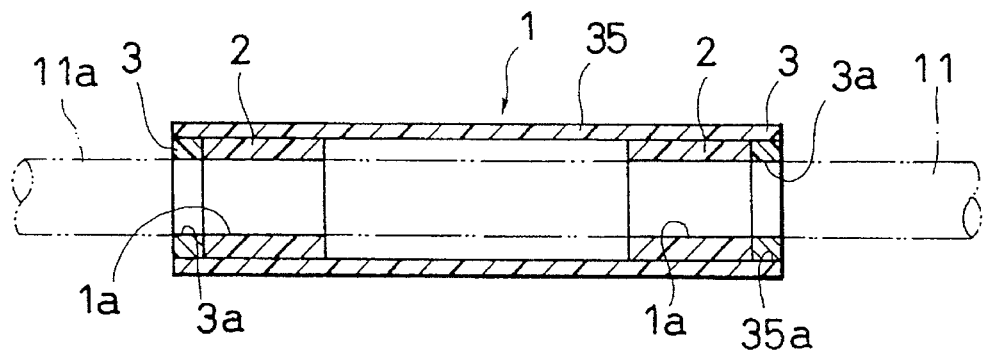
FIG. 15 is a longitudinal cross-sectional view of another embodiment of the present invention.

FIG. 15 illustrates another embodiment of the present invention.

The sliding bearing 1 of this embodiment comprises an outer tube 35 made of metal or synthetic resin; a pair of cylindrical sliding bearing bodies 2 made of a synthetic resin opposing the shaft 11, provided on the two end sections in the longitudinal direction of the inner surface of the outer tube 35 and slightly inset from the axially outer end surfaces; and a ring-shaped lubricating composition member 3 which is fitted into an inner peripheral surface 35a on the axially outside of the sliding bearing member 2. In this case, both the inner peripheral surface of the sliding bearing member 2 and the inner peripheral surface of the lubricating composition member 3 form the sliding surface 1a to oppose the shaft 11.

The inner diameter of the sliding bearing member 2 is almost identical to the inner diameter of the lubricating composition member 3, so that both of the inner peripheral surface of the sliding bearing bodies 2 and the inner peripheral surface of the lubricating composition member 3 contact the shaft 11. Further, the inner diameter of the lubricating composition member 3 may be slightly larger than the inner diameter of the sliding surface 1a, so that the lubricating composition member 3 does not contact the shaft 11 with the inner peripheral surface of the bearing bodies 2 forming the sliding surface 1a.

This is a type where the shaft 11 is supported at two locations spaced apart in the longitudinal direction, and as a modification the application of the previously mentioned embodiments to both ends of each sliding bearing member 2 may be considered, but the actions and effects are almost the same.

Figure 16:
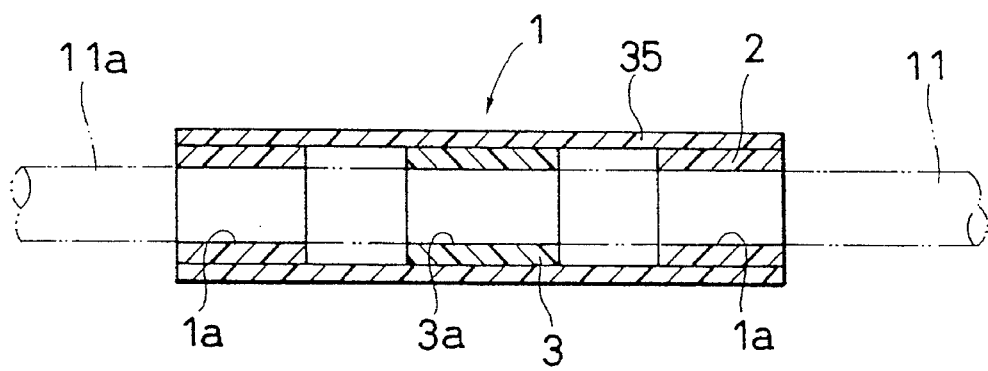
FIG. 16 is a longitudinal cross-sectional view of another embodiment of the present invention.

FIG. 16 illustrates another embodiment of the present invention.

The sliding bearing 1 of this embodiment differs from that of the embodiment of FIG. 15 inasmuch as the cylindrical lubricating composition member 3 is provided between a pair of sliding bearing bodies 2 which are positioned at both end sections of the outer tube 35. The volume of the lubricating composition member 3 can be large, so there is the advantage that it can contain a large amount of lubricating oil. However, the other actions and effects are almost identical to those of the embodiment of FIG. 15.

Figure 17:
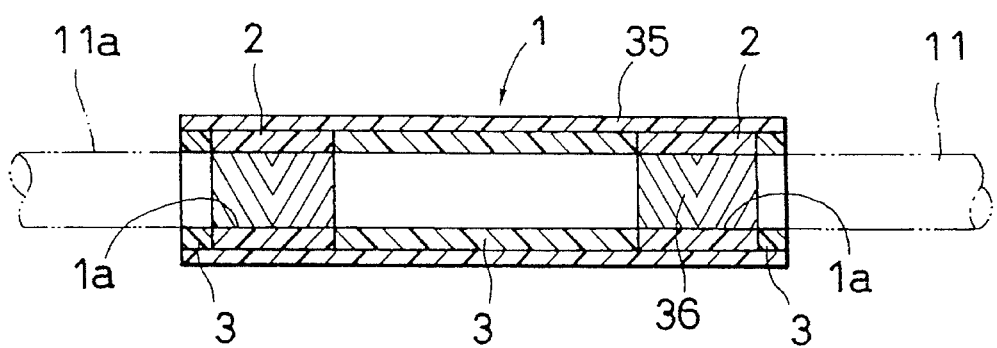
FIG. 17 is a longitudinal cross-sectional view of another embodiment of the present invention.

FIG. 17 illustrates another embodiment of the present invention.

The sliding bearing 1 of this embodiment combines the structures of the embodiments of FIG. 15 and 16. The lubricating composition member 3 is provided at the middle and at both ends, specifically, in three locations, and herringbone shaped grooves 6 for generating dynamic pressure through rotary motion are provided on the inner periphery or sliding surface 1a of the sliding bearing member 2 at the end sections.

In this embodiment, when a relative rotary motion occurs between the sliding bearing 1 and the shaft 11, dynamic pressure by the pumping action of the grooves 36 for generating dynamic pressure is produced in the lubricating oil which feathers from the lubricating composition member 3 and enters the bearing gap between the sliding bearing 1 and the shaft 11. As a result, there is no contact between the sliding bearing 1 and the shaft 11, so that extremely low friction occurs.

FIG. 18 illustrates another embodiment of the present invention.

The sliding bearing 1 of this embodiment is a type which generates dynamic pressure through linear motion, as opposed to the type in the embodiment of FIG. 17 which generates dynamic pressure through rotary motion. Specifically, dynamic pressure generating grooves 37 for forward and backward linear movement are provided in staggered shapes on the sliding surface 1a of the sliding bearing member 2. A groove 37A pointed in the direction of the arrow A and a groove 37B pointed in the direction of the arrow B alternately make up a continuous waveform in the peripheral direction at almost uniform intervals in the axial direction.

Furthermore, the grooves 37 may also be formed in other shapes, such as a flared shape or a diamond shape.

In this embodiment, when the sliding bearing 1 moves linearly with respect to the shaft 4 in the arrow A direction, the pressure of the lubricating oil at the tip of the arrow increases from the pumping action of the dynamic pressure generating grooves 37B in the reverse direction, and dynamic pressure is generated so that the sliding bearing 1 is supported out of contact with the shaft 11. In addition, when the sliding bearing 1 moves linearly in the arrow B direction, dynamic pressure is produced from the pumping action of the dynamic pressure generating grooves 37A in the same manner, but opposite to the action described above, and the sliding bearing 1 is also supported out of contact with the shaft 11.

As a result, dynamic pressure is produced in the lubricating oil supplied from the lubricating composition member 3 to the bearing gap from the pumping action of the dynamic pressure generating grooves 37, thus forming a lubricating oil film between the sliding surfaces 1a and 11a to reduce wear.

FIGS. 19(a) and 19(b) illustrate another embodiment of the present invention. In the sliding bearing 1 of this embodiment, an axial slit 40 is provided in the cylindrical lubricating composition member 3 installed at the middle section of the outer tube 35 in the ninth embodiment. Provision of the slit 40 gives the advantage of making it possible to install the lubricating composition member 3 after the sliding bearing member 2 is installed in the outer tube 35.

In addition, the lubricating composition member 3 does not necessarily have to be cylindrical. It may be formed by rolling an easily-formed sheet and then installed by insertion into the middle section of the outer tube 35. The lubrication action and effect are substantially the same as for the embodiment of FIG. 16.

FIG. 20 illustrates another embodiment of the present invention.

In the sliding bearing 1 of this embodiment, the installation structure of the two ends of the lubricating composition member 3 differs from that in the embodiment of FIG. 15 in that a ring-shaped indented groove 11 is formed in each end section of the outer tube 35, and a ring-shaped protrusion 42 corresponding to the ring-shaped indented groove 41 is formed in the outer periphery of the lubricating composition member 3. The lubricating composition member 3 is secured to the outer tube 35 by the engagement of the protrusion 42 in the indented groove 41. As a result, there is the advantage that the lubricating composition member 3 is firmly secured.

In each of the above-mentioned embodiments, the outer shape of the sliding bearing 1 is illustrated as cylindrical, but the sliding bearing 1 may also be square or some other shape.

Also, the sliding bearing 1 of the embodiments in FIGS. 8 to 14 may be fitted with an outer tube 35 made of metal or of a synthetic resin.

In addition, both the arrangement and the shape of the lubricating composition member 3 is not limited by the above-mentioned embodiments. The various embodiments may also be combined or may have completely different arrangements or shapes. These can be arbitrarily set as required. Further, the sliding bearing member 2 and the lubricating composition member 3 may be axially adjacent or may be slightly separated from each other.

As is clear in the foregoing explanation, because the sliding bearing of the present invention, which operates with a sliding motion along a shaft, comprises a sliding bearing member made of a synthetic resin, opposing the shaft; and a lubricating composition member made of a lubricant-oil containing resin, opposing the shaft, a large quantity of lubricating oil contained in the body of the lubricating composition member gradually feathers so as to be fed into the bearing gap so that lubricating oil is provided to the sliding surfaces of the shaft and the bearing over a long period of time, and the lubricating oil never runs out and contrarily flows out as causing a droplet so that a good lubricating function is demonstrated. Therefore, the friction and wear characteristics are superior and there is no soiling around the periphery of the bearing caused by expulsion of the lubricating oil.

What is claimed is:

1. A sliding bearing having a sliding surface adapted to move with reference to a sliding guide surface with the sliding surface of the bearing facing the sliding guide surface, the bearing comprising a sliding bearing member made of synthetic resin to substantially define the sliding surface of the bearing, and a lubricating composition member made of synthetic resin that contains lubricating oil therein and assembled with the sliding bearing member so that the lubricating composition member is opposed to the sliding guide surface.

2. The sliding bearing of claim 1, wherein the lubricating composition member is loosely held in the sliding bearing member so as to come by its weight in contact with the sliding guide surface in use.

3. A sliding bearing having a sliding surface adapted to move with reference to a sliding guide surface with the sliding surface of the bearing faced to the sliding guide surface, the bearing comprising a sliding bearing member made of synthetic resin to generally define the sliding surface of the bearing and a lubricating composition member made of synthetic resin that contains lubricating oil therein and assembled with the sliding bearing member with a slight clearance between the lubricating composition member and the sliding guide surface.

4. The sliding bearing of claim 1 or 3, wherein the lubricating composition member is fitted into the sliding bearing member.

5. The sliding bearing of claim 1 or 3, wherein the sliding guide surface is formed by a flat track, so that the bearing is operated to linearly move on the flat track.

6. The sliding bearing of claim 1 or 3, wherein the sliding guide surface is formed by a curved track, so that the bearing is operated to linearly move on the curved track.

7. The sliding bearing of claim 1 or 3, wherein the lubricating composition member comprises a plurality of columns having smaller radius and a flat bottom surface, and fitted into evenly spaced, axial through holes located within the sliding bearing member near its outer circumference, and the flat bottom surfaces of the lubricating composition member are evenly dispersed to appear in locations to define part of the sliding surface of the sliding bearing.

8. The sliding bearing of claim 1 or 3, wherein the sliding bearing member has a flange section, a column-shaped body section which depends down from the flange section and has a spherical bottom surface, and an installation section which protrudes up from the flange section, and the lubricating composition member covers the body section such that the lubricating composition member is thinner in thickness on the spherical bottom surface.

9. The sliding bearing of claim 1 or 3, wherein the sliding bearing member has a flange section, a hollow cylindrical body section which depends down from the flange section and has a flat annular bottom to substantially define the sliding surface, and an installation section which protrudes up from the flange section, and a lubricating composition member fitted into the body section such that the lubricating composition member has a lower end which is flush with the flat annular bottom surface, so that the lower end of the lubricating composition member appears in the center of the flat annular bottom surface of the cylindrical body section to define part of the sliding surface of the sliding bearing.

10. The sliding bearing of claim 1 or 3, wherein the sliding bearing member has a flange section, a column-shaped body section which depends down from the flange section and has a spherical bottom surface, and an installation section which protrudes up from the flange section, and the lubricating composition member is made of strips which are circumferentially spaced apart and extend to the bottom surface of the sliding member to form a cross-shaped pattern, such that the lubricating composition member is thinner in thickness on the spherical bottom surface.

11. The sliding bearing of claim 1 or 3, wherein the sliding bearing member of synthetic resin is formed in a cylindrical shape and has a larger radius, and the lubricating composition member is formed in a thin cylindrical shape and embedded in the sliding bearing member to extend toward the sliding guide surface, and the sliding bearing member has a flat, circular bottom surface which is substantially the sliding surface of the linear-motion sliding bearing.

12. The sliding bearing of claim 1 or 3, wherein the sliding bearing is placed in a sliding motion relationship with a shaft which forms the sliding guide surface so that the bearing freely slides on the shaft.

13. The sliding bearing of claim 12, wherein the sliding bearing member has a flanged end section which is provided on one end of the sliding bearing member to have a cylindrical inner peripheral surface and an annular sliding surface, so that this bearing acts as both a radial bearing and a thrust bearing, and the lubricating composition member is formed in the shape of small cylindrical bodies and radially incorporated in the sliding bearing member to appear in the cylindrical inner peripheral surface of the sliding bearing member, so that the end surfaces of these small cylindrical bodies are opposed to the shaft, and in the shape of small cylindrical bodies and axially incorporated in the flanged end section to appear in the annular sliding surface of the flanged end section.

14. The sliding bearing of claim 12, wherein the sliding bearing member has an inner peripheral surface, which generally defines the sliding surface of the bearing, the sliding bearing member has a plurality of axial grooves formed parallel to the shaft on the inner peripheral surface of the sliding bearing member and a plurality of radial grooves which are continued to the axial grooves and extend radially to the sliding surface of the flanged end section, and the lubricating composition member is formed in an L-shape and incorporated into the respective grooves so as to be opposed to the shaft.

15. The sliding bearing of claim 12, wherein the shaft extends through an outer tube, the sliding bearing member is made in a pair of cylindrical sliding bearing bodies and fitted into the outer tube so as to be opposed to the shaft, and the lubricating composition member is made in a ring-shape and fitted into the outer tube, so that both the sliding bearing member and the lubricating composition member form the sliding surface to oppose the shaft.

16. The sliding bearing of claim 15, wherein the sliding bearing member has an inner peripheral surface opposed to the shaft, in which a plurality of staggered grooves are provided for generating dynamic pressure in use.

17. The sliding bearing of claim 12, wherein and the sliding bearing member comprises a cylindrical body section having outer and inner peripheries and two annular axial end section having an outer periphery, and the outer periphery of the body section is recessed from the outer periphery of the end sections in the shape of an indented groove, and the lubricating composition member formed as a cylindrical body is incorporated in the indented groove section, and has a plurality of small cylindrical projections extend radially inwardly toward the shaft through the cylindrical body section to appear in the inner peripheral surface of the cylindrical body section.

18. The sliding bearing of claim 12, wherein the sliding bearing member has an inner peripheral surface in which a plurality of parallel grooves is formed in the axial direction, and the lubricating composition member axially extending in a band shape to be incorporated into these grooves, so that the lubricating composition member are opposed to the shaft.

19. The sliding bearing of claim 12, wherein the lubricating composition member is formed in a plurality of rings and arranged at equal intervals in the axial direction, so that the lubricating composition member are opposed to the shaft.

20. The sliding bearing of claim 12, wherein the sliding bearing member is made of a cylindrical synthetic resin and opposed to the shaft; and the inner peripheral surface of the sliding bearing member acts as a sliding surface in opposition to the shaft, and is fitted around the shaft so that the sliding surface slides freely along the shaft with relative motions including rotary motion, linear motion.

21. The sliding bearing of claim 12, wherein the lubricating composition member formed in a cage shape having a cylindrical body section and two annular axial end portions, wherein the cylindrical body section is cut open in the axial direction so as to be formed in a plurality of axial band shapes, so that the two axial end portions are connected by the cylindrical body section, and the cage-shaped lubricating composition member is integrally embedded in the sliding bearing member to be opposed to the shaft.

22. The sliding bearing of claim 1 or 3, wherein the sliding bearing member of synthetic resin has a radially larger cylindrical body section and has a plurality of deep axial slots, and a flat, circular bottom surface which substantially forms the sliding surface of the sliding bearing, and the lubricating composition member is shaped in flat plates and fitted into the deep axial slots, and the lubricating composition member appear on the flat, circular sliding surface of the sliding bearing to define part of the sliding surface.

23. The sliding bearing of claim 1 or 3, wherein the sliding bearing member of synthetic resin has a body section having a bottom surface which is formed with staggered grooves for generating dynamic pressure in use.

24. The sliding bearing of claim 1 or 3, wherein the lubricating composition member is a thermoplastic resin containing 10 to 90% by weight of lubricating oil.

25. The sliding bearing of claim 24, wherein the lubricating oil is selected from the group of mineral oil, synthetic oil, ester oil and diester oil.

26. The sliding bearing of claim 1 or 3, wherein the lubricating composition member is a thermosetting resin containing 10 to 90% by weight of lubricating oil.

27. The sliding bearing of claim 26, wherein the lubricating oil is selected from the group of mineral oil, synthetic oil, ester oil and diester oil.

28. A sliding bearing of claim 1, wherein said sliding bearing member partly defines the sliding surface of the bearing.

29. A sliding bearing having a sliding surface adapted to move with reference to a shaft having a sliding guide surface with the sliding surface of the bearing faced to the sliding guide surface of the shaft in a sliding motion relationship, the shaft extending through an outer tube, the bearing comprising a sliding bearing member made of synthetic resin to substantially define the sliding surface of the bearing and a lubricating composition member made of synthetic resin that contains lubricating oil therein and assembled with the sliding bearing member to partly define the sliding surface of the bearing, the sliding bearing member made in a pair of cylindrical sliding bearing bodies and fitted into the outer tube so as to be opposed to the shaft, and the lubricating composition member made in a ring-shape and fitted into the outer tube, so that both the sliding bearing member and the lubricating composition member form the sliding surface to oppose the shaft.

30. A sliding bearing having a sliding surface adapted to move with reference to a shaft having a sliding guide surface with the sliding surface of the bearing faced to the sliding guide surface of the shaft in a sliding motion relationship, the shaft extending through an outer tube, the bearing comprising a sliding bearing member made of synthetic resin to generally define the sliding surface of the bearing and a lubricating composition member made of synthetic resin that contains lubricating oil therein and assembled with the sliding bearing member with a slight clearance between the lubricating composition member and the sliding guide surface, the sliding bearing member made in a pair of cylindrical sliding bearing bodies and fitted into the outer tube so as to be opposed to the shaft, and the lubricating composition member made in a ring-shape and fitted into the outer tube, so that the sliding bearing member forms the sliding surface to oppose the shaft with the lubricating composition member in a non-contact relationship with the shaft.

* * * * *